UNITED STATES PATENT OFFICE.

HALE W. PARRISH, OF CHICAGO, ILLINOIS.

LIQUID-FUEL BURNER.

1,394,576.

Specification of Letters Patent.   Patented Oct. 25, 1921.

Application filed April 3, 1918. Serial No. 226,365.

*To all whom it may concern:*

Be it known that I, HALE W. PARRISH, citizen of the United States, residing at Chicago, in the county of Cook and State of Illinois, have invented certain new and useful Improvements in a Liquid-Fuel Burner; and I do hereby declare the following to be a full, clear, and exact description of the invention, such as will enable others skilled in the art to which it appertains to make and use the same.

My invention relates to appliances for utilizing finely divided fuel, and in some of its aspects relates to means for efficiently using liquid fuel without preheating the same, and for insuring an adequate supply of air to afford complete combustion. In another aspect, my invention relates to a fuel-burning apparatus employing electrical ignition, and aims to effect a joint operation of the current-supply means and of the combustible-mixture-supplying means so that the electrical energy for the ignition will be generated only when the heat of the burnt combustible mixture is needed and supplied, thereby avoiding a waste of the electrical energy or of the means for producing the latter. Moreover, my invention aims to employ simple and mechanically actuated means for generating and controlling the electrical energy, thereby entirely avoiding the use of batteries, chemicals and switches. My invention also desirably aims to operate the electrical generator by the same supply of air which effects the vaporizing of the liquid fuel and the supplying of the liquid fuel as well as of air for the combustible mixture.

In another aspect, my invention aims to provide simple means for expanding and heating the mixture of air and vaporized fuel and for reducing the velocity of this mixture by the time the latter reaches the igniting means, thereby enabling the ignition to be simply and positively effected. In this connection, my invention aims to provide simple and positive means for initially producing a mixture of such richness as to be readily ignited even when cold, for injecting this mixture at a velocity lower than the rate of flame propagation, and for initially producing this injecting in such short puffs as not to induce an undue admixture of air, thereby also giving the injected mixture time to expand and reduce in velocity before it reaches the ignition means. It also aims to provide means for automatically increasing the rate of the mixture-injecting puffs. Likewise, I am to effect both the initial supply of a rich mixture of fuel and air, and to do this with a relatively small expenditure of power by employing the natural draft of the burner for supplying the greater part of the needed air. Furthermore, my invention aims to provide simple means for maintaining a suitable relation between the air supply and the vaporized fuel regardless of the rate at which the fuel is supplied and to provide simple means for stopping the supply of liquid fuel when the supply of air and the ignition are both discontinued.

In still another aspect, my invention aims to provide a fuel-burning apparatus which will be automatically responsive to the operative condition of the device in which the heat of the burner is utilized, and to provide simple and positive means responsive to the operative condition of such a device for automatically controlling the fuel supply, the air supply, and ignition, and preferably for simultaneously controlling all the three. More particularly, my invention aims to use compressed air for the three-fold purpose of driving an ignition-current generator, vaporizing and injecting liquid fuel, and injecting air; to employ a single and simple air valve for controlling the supply of air for this three-fold purpose, and desirably to make this air valve automatically responsive to the operative condition of the device heated by the combustion of the liquid fuel.

Still further and to some extent more detailed objects will appear from the following specification and from the accompanying drawings which illustrate a desirable embodiment of my invention.

In the drawings, Figure 1 is a partially sectional view of one embodiment of my invention, with a part of the connections between the boiler and the control valve omitted to avoid confusion, and with the relative position and size of the various parts altered to clarify the illustration.

Figure 1:
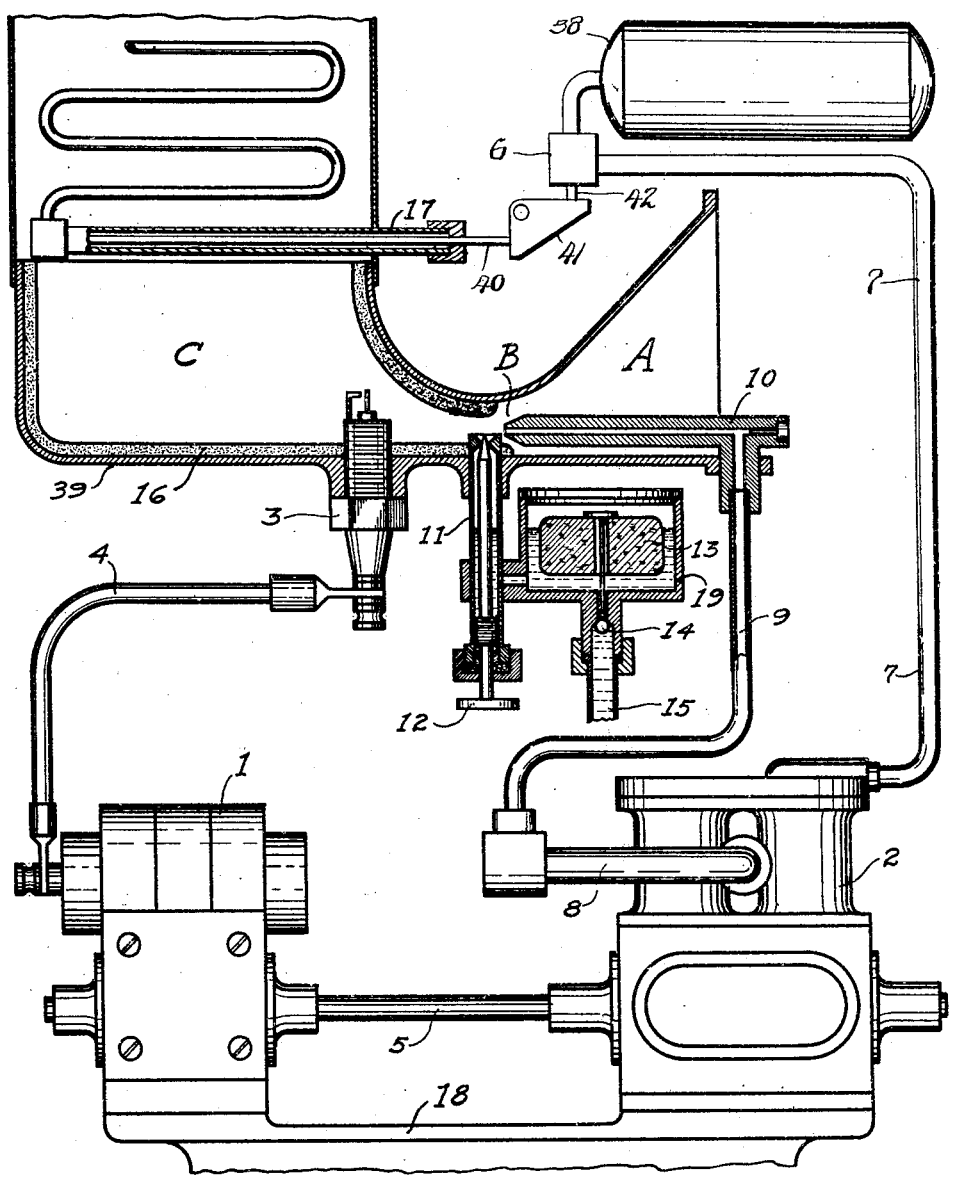

In the embodiment of Fig. 1, the fuelheat-utilizing appliance consists of a boiler of the flash type in which the steam is generated within a pipe 17 exposed to the heat of the firebox C. This firebox has a substantially venturi-shaped inlet A affording a contracted portion, in which contracted portion I locate the mouth of an oil-supply 11 which leads to a tank 19 in which the level of the oil or other liquid fuel is controlled by a float 13. Liquid fuel is supplied to the tank 19 by suitable means, such as a pipe 15 controlled by a valve 14, which valve is opened by gravity when the level of the liquid in the tank drops below a certain point and is closed by a float when the desired level is restored. This level is desirably at some distance below the mouth of the fuel inlet 11, which inlet may be adjusted to its effective size by a needle valve 12.

Adjacent to the mouth of the fuel inlet I dispose the tip of a tube 10 adapted to project compressed air across the mouth of the fuel inlet, so as to draw liquid fuel by suction out of the pipe 11 and to atomize this fuel into a spray directed into the interior of the firebox C. Compressed air is supplied for this purpose through a pipe 9 leading from the exhaust pipe 8 of a motor driven by compressed air, the supply of compressed air being furnished from a tank 38 through piping controlled by a valve 6. Driven by the said motor, and desirably direct-connected to the shaft 5 of the motor, is an electric current generator, such as a magneto 1, which magneto in this instance has one of its terminals grounded through the frame 18 of the motor and magneto unit and through the piping to the casing of the firebox, while the other terminal of the magneto is connected through a conductor 4 with the insulated terminal of a spark plug 3 extending through the casing of the firebox. This spark plug is located at some distance from the mouth of the fuel supply pipe 11 and is desirably near the widest portion of the inner end of the said venturi. Consequently, the atomized fuel and the air introduced with the same expand while passing through the widening portion of the venturi, thereby sufficiently reducing the velocity of the mixture of air and fuel, so that this velocity will not be sufficient to extinguish the fuel when ignited by the spark plug 3. By suitably adjusting the shape of the venturi and the relative positions of the spark plug and of the atomizer (which latter not only furnishes air through the pipe 10 but also injects additional air from outside the casing through the venturi), I can readily reduce the velocity of the entering mixture of air and vaporized fuel so that a spark at the tip of the spark plug will promptly ignite the mixture, and so that the flame will not be extinguished by the current of mixed air and vaporized oil. By so doing, I am able to secure a positive and immediate ignition of the vaporized fuel without preheating the latter, thereby avoiding the delays which have heretofore been customary in cold weather and with cold fuel in awaiting the action of the preheating means employed by others. However, I may desirably extend the refractory lining 16 of the firebox to the contracted portion B of the venturi, thereby utilizing the heat-retaining properties of this lining for somewhat warming the combustible mixture before it reaches the operative tip of the spark plug.

In operation, assuming the heating of the boiler to be below the desired point, the valve 6 is opened, thereby supplying compressed air to the motor 2 and likewise furnishing the exhaust air from this motor at a somewhat reduced pressure to the combined atomizer and injector pipe 10. Consequently, the motor by operating the magneto will produce a continuous series of sparks at the tip of the spark plug, while the air forcibly projected through the pipe 10 will vaporize liquid fuel and force a mixture of air and vaporized fuel into the firebox C. As this combustible mixture is expanded in the widening portion of the inlet, and therefore reduced in its rate of movement by the time it reaches the spark plug, it is promptly ignited, and the continuing of the series of sparks prevents any possible blowing out of the resulting flame. When the effect for which the fuel is consumed reaches a desired point (as for example when the heat in the tube 17 exceeds a predetermined minimum), the valve 6 is gradually closed. This slows down the motor 2 thereby increasing the interval between the sparks of the spark plug, and also depreciates the pressure in the atomizer 10, thereby reducing the rate at which the vaporized fuel and air are projected into the firebox. Thus the supply of fuel and air may be continued in suitably reduced proportions while still operating the ignition means; and, upon closing the valve 6 entirely, the motor and magneto are shut down and the supply of compressed air through the pipe 10 is discontinued, thereby entirely stopping the injection of the combustible mixture and also the supply of electric energy for the spark plug. However, as soon as the valve 6 is again opened even partially, the supplying of the combustible mixture and the providing of the sparks for the ignition are resumed, thereby immediately providing fresh heat for the appliance to which the firebox C is connected.

Figure 3:
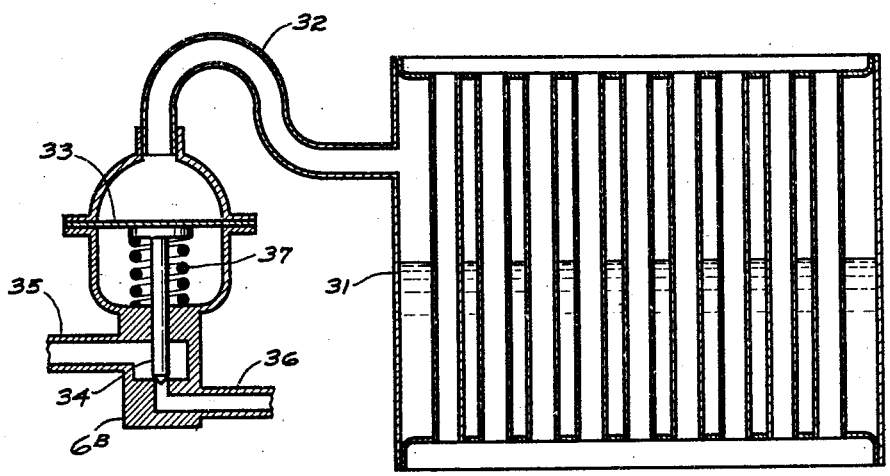
Fig. 3 is a sectional view showing a valve control arrangement suitable for use with a water level boiler in connection with the embodiment otherwise shown in Fig. 1.

To make the resulting supply of heat instantly responsive to the actual needs, I desirably construct and connect the valve 6 in such a manner that it will be automatically responsive to the operative condition of the device utilizing the heat. For example, I may mount a thermostatic rod 40 in one of the tubes 17 of the boiler of Fig. 1, this rod being of a material having a higher coefficient of expansion than the tube 17. The rod 40 projects beyond the tube 17 and is connected through a bell-crank lever 41 with the plunger stem 42 of a spring-retracted throttling valve 6 inserted in the compressed air supply pipe 7 between the tank 38 and the motor 2. Consequently, the expanding of the rod 40 by the heating of the boiler will gradually throttle the supply of air to the motor and reduce the speed of the latter, while a cooling of the boiler will allow the spring-pressed valve member to increase the supply of air for the motor. Likewise, with a flash type of boiler I may connect the stem 24 of the valve through a bell-crank lever 23 with a rod 21 exposed to the temperature within the tube 17 and having a lower coefficient of expansion than the tube 17, so that the relative contraction of the rod 21 will open the valve against the resistance of a suitably arranged spring 25, which spring will close the valve when the rod 21 is suitably expanded by the heat within the tube 17. Or, where my liquid fuel burner is used with a water level type boiler I may operate the stem 34 of the valve by a diaphragm 33 subject to the pressure of the steam in the boiler, and may return the valve stem to its open position by a spring 37 substantially as shown in Fig. 3.

Figure 2:
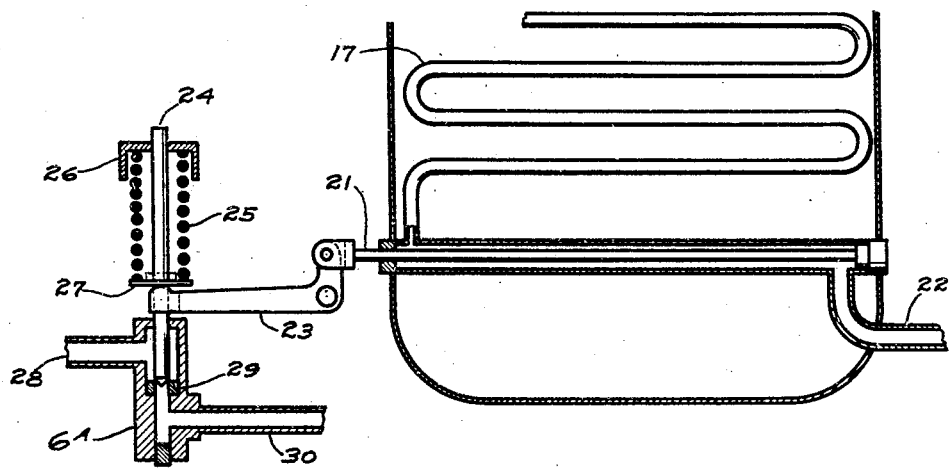
Fig. 2 is a sectional view of a portion of a flash type boiler and of a desirable form of valve controlling means for use with this type of boiler and with the embodiment of my invention as shown in Fig. 1.

With either of the arrangements thus shown in Figs. 2 and 3, it will be obvious that when the operative condition of the boiler falls below a predetermined point, the valve will be opened, thereby permitting compressed air to flow from the tank 38 for the double purpose of injecting the combustible mixture and of furnishing the ignition sparks. As the operative condition of the boiler approaches a given point, the valve will gradually be closed, thereby reducing the rate of supply of the combustible mixture and the rate of sparking and finally discontinuing both. Moreover, it will be obvious that the control thus afforded is independent of the relative proportions of air and fuel which may be adjusted by means of the needle valve 12 according to the nature of the fuel and the barometric pressure. The ignition means are exceedingly simple, involving only a single insulated conductor, and the control of the fuel is afforded entirely by the injected air and by gravity. Also, it will be obvious that by suitably shaping and proportioning the venturi, and by suitably proportioning the compressed-air injecting means and the starting speed of the motor, I can readily insure such a supply of air as will afford complete combustion with a minimum cooling by a possible excess of the air supply. That is to say, when the motor is started from a standstill, the load imposed on it by the magneto causes it to start slowly, so that the exhaust injected through the pipe 10 at first comes in short puffs separated by considerable time intervals. Owing to the shortness of each of these initial puffs and their intermittency, practically no air will be drawn in from outside the fire-box, so that the atomized fuel is mixed only with a relatively small amount of air supplied during each puff through the pipe 10. The resulting mixture is therefore exceedingly rich, and as it has time to expand in the Venturi tube before reaching the spark plug, I obtain the combination of a rich mixture and low velocity which is essential for igniting the fuel while comparatively cold. After the mixture ignites, its richness is gradually diminished by the faster injection of air through the nozzle 10, and also by the air drawn in from outside the fire-box. This outer air is drawn in partly by the injector action afforded by disposing the nozzle of the atomizer within the Venturi tube, but mostly by the natural draft of the fuel burner, so that I save the greater part of the power which would be required if the air was all supplied by a blower after the manner heretofore in use.

However, while my fuel burning device desirably includes a valve automatically responsive to the operative condition of the appliance utilizing the heat of the fuel, I do not wish to be limited to the inclusion of an automatic valve, as the valve 6 might obviously be operated by hand. Neither do I wish to be limited to the particular means for controlling the level of the fuel supply as here illustrated, nor to other details of the construction and arrangement here disclosed, it being obvious that the same might be modified in many ways without departing from the spirit of the appended claims.

I claim as my invention:—

1. In a fuel burner, a fire-box, a spark plug and a fuel atomizer disposed in operative relation thereto, an electric generator operatively connected to the spark plug, an air-driven motor for driving the generator, and connections between the motor and the atomizer for utilizing the exhaust of the motor in the atomizer.

2. Fuel burning mechanism as per claim 1, in combination with an appliance utilizing the heat of the burnt fuel, and means responsive to the operative condition of the said appliance for controlling the supply of actuating air to the motor.

3. Fuel burning mechanism as per claim 1, in combination with an appliance utilizing the heat of the burnt fuel, and means responsive to the temperature of the said appliance for controlling the supply of actuating air for the motor.

4. In a fuel burning device, a casing, common means for injecting air and fuel thereinto, ignition means disposed within the casing and in the path of the injected air and fuel, and conjointly operating means for controlling the injecting means and the ignition means, the said operating means including means arranged for initially limiting the injecting to intermittent puffs of a relatively rich mixture.

5. In a liquid fuel burning device, a firebox equipped with an air inlet leading from the outer air, a fuel atomizer disposed in operative relation to the inlet, a supply of fuel and a supply of compressed air both operatively connected to the atomizer, ignition means in the path of the atomized fuel, a motor interposed between the supply of compressed air and the atomizer, and connections whereby the motor actuates the ignition means.

6. In a fuel burner, a fire box, a spark plug and a fuel atomizer disposed in operative relation thereto, an electric generator operatively connected to the spark plug, an air-driven motor arranged for driving the generator, a supply of compressed air, and connections whereby the compressed air is used successively for driving the motor and for actuating the atomizer.

7. In a fuel burning device, a casing equipped with adjacent inlets for air and fuel and shaped for affording an expansion of the air and fuel entering the casing from the said inlets, means for injecting fuel and air through the said inlets into the casing, ignition means disposed in a portion of the casing in which the said expansion of fuel and air has ben afforded, and conjointly operating means for controlling the said injecting and ignition means, the last named means including a magneto initially acting as a brake to space the injections by relatively long time intervals.

8. The method of starting a liquid-fuel-burning device, which consists in initially injecting a mixture of air and atomized fuel into a fire-box at relatively low velocity and considerable time intervals, subjecting each injection to ignition after its velocity has been reduced, and gradually increasing both the rate of the injections and the velocity thereof.

9. In a fuel burning mechanism, a casing having an air inlet freely open to the outer air, a fuel inlet nozzle disposed within the said inlet, a compressed air inlet also disposed within the said inlet and arranged both for vaporizing the fuel and for injecting air into the casing, means for expanding the resulting mixture of the vaporized fuel and air, and ignition means disposed for igniting the said expanded mixture, in combination with conjointly operating means for supplying the compressed air and for actuating the ignition means.

10. The method of starting combustion of liquid fuel in a fire-box, which consists in initially projecting a mixture of liquid fuel and air into the fire-box by means of an atomizer disposed in an air inlet and operating at so low a pressure and for so short a time as to afford practically no injector effect on the air surrounding the atomizer, igniting each of the said relatively short injections after the same has expanded and reduced in velocity, and thereafter increasing the pressure under which the atomizer is operating to cause the latter to inject surrounding air.

11. In a fuel-heated appliance, a firebox having an inlet for external air in the form of a Venturi tube, a fuel inlet terminating in the neck of the said tube, a compressed air inlet also terminating within the said neck and disposed both for injecting air from outside the firebox through the Venturi tube and for vaporizing fuel issuing from the fuel inlet and for projecting the said vaporized fuel into the firebox; ignition means disposed within the firebox substantially at the inner end of the said Venturi tube, and a heat-storing lining for the firebox extending into the Venturi tube to the fuel inlet so as to heat the resulting mixture of air and fuel while the latter is expanding during its movement toward the ignition means.

12. The method of employing compressed air in operating a liquid fuel burner, which consists in utilizing part of the pressure of the compressed air for operating ignition means, and employing the remaining pressure thereof for atomizing the fuel.

13. The method of employing compressed air in operating a liquid fuel burner, which consists in utilizing part of the pressure of a given supply of compressed air for operating ignition means, and employing the remaining pressure thereof for atomizing the fuel and for injecting additional air.

14. In an automatic fuel regulating system, a firebox, an atomizer disposed for projecting liquid fuel into the same, a spark-plug in the path of the atomized fuel, a supply of air at a pressure in excess of that required by the atomizer, connections whereby the supply of air actuates the atomizer, and spark-plug operating means utilizing the said excess of pressure.

15. In an automatic fuel regulating system, a fire-box, an atomizer disposed for projecting liquid fuel into the same, a spark-plug in the path of the atomized fuel, a supply of compressed air for the atomizer, a valve controlling the supply of compressed air, and spark-plug actuating means responsive in operation to the supply of compressed air and operatively disposed between the supply of compressed air and the atomizer.

Signed at Chicago, Illinois, March 30th, 1918.

HALE W. PARRISH.